US007305567B1

(12) United States Patent
Hussain et al.

(10) Patent No.: US 7,305,567 B1
(45) Date of Patent: Dec. 4, 2007

(54) DECOUPLED ARCHITECTURE FOR DATA CIPHERING OPERATIONS

(75) Inventors: Muhammad Raghib Hussain, Pleasanton, CA (US); Richard E. Kessler, Shrewsbury, MA (US)

(73) Assignee: Cavium Networks, In., Mountain View, CA (US)

( * ) Notice: Subject to any disclaimer, the term of this patent is extended or adjusted under 35 U.S.C. 154(b) by 772 days.

(21) Appl. No.: 10/234,895

(22) Filed: Sep. 4, 2002

Related U.S. Application Data

(60) Provisional application No. 60/362,029, filed on Mar. 6, 2002, provisional application No. 60/361,248, filed on Mar. 1, 2002.

(51) Int. Cl.
*G06F 11/30* (2006.01)
*H04L 9/32* (2006.01)
*H04L 9/00* (2006.01)
(52) U.S. Cl. .................. 713/189; 713/194; 713/189; 713/153; 380/264
(58) Field of Classification Search ............. 713/189, 713/194; 380/264
See application file for complete search history.

(56) References Cited

U.S. PATENT DOCUMENTS

| 5,488,729 | A | | 1/1996 | Vegesna et al. | |
| 5,615,263 | A | * | 3/1997 | Takahashi | 713/164 |
| 5,925,123 | A | | 7/1999 | Tremblay et al. | |
| 5,949,881 | A | * | 9/1999 | Davis | 713/189 |
| 6,088,797 | A | | 7/2000 | Rosen | |
| 6,101,255 | A | * | 8/2000 | Harrison et al. | 380/52 |
| 6,112,019 | A | | 8/2000 | Chamdani | |
| 6,115,816 | A | * | 9/2000 | Davis | 713/153 |
| 6,157,955 | A | * | 12/2000 | Narad et al. | 709/228 |
| 6,173,400 | B1 | | 1/2001 | Perlman et al. | |
| 6,233,684 | B1 | | 5/2001 | Stefik et al. | |
| 6,240,508 | B1 | * | 5/2001 | Brown et al. | 712/219 |
| 6,295,604 | B1 | * | 9/2001 | Callum | 713/160 |
| 6,311,261 | B1 | | 10/2001 | Chamdani | |
| 6,327,647 | B1 | | 12/2001 | Moyer et al. | |
| 6,327,652 | B1 | | 12/2001 | England et al. | |
| 6,363,488 | B1 | | 3/2002 | Ginter et al. | |
| 6,477,646 | B1 | * | 11/2002 | Krishna et al. | 713/189 |
| 6,571,335 | B1 | * | 5/2003 | O'Donnell et al. | 713/173 |

(Continued)

FOREIGN PATENT DOCUMENTS

WO  WO 01/05086 A2  1/2001

OTHER PUBLICATIONS

Jun, B., et al., "The INTEL Random Number Generator", Cryptography Research, Inc. White Paper prepared for Intel, Apr. 22, 1999, (8 pages).

(Continued)

*Primary Examiner*—Emmanuel L. Moise
*Assistant Examiner*—Techane J. Gergiso
(74) *Attorney, Agent, or Firm*—Blakely, Sokoloff, Taylor & Zafman, LLP

(57) ABSTRACT

In one embodiment, an apparatus comprises a microcontroller unit to store instructions into an execution queue. The apparatus also comprises an execution queue unit to generate a widely decoded functional execution instruction based on at least one instruction stored in the execution queue. Additionally, the apparatus comprises a functional unit to execute the widely decoded functional execution instruction asynchronous to the generation of the widely decoded functional execution instruction.

30 Claims, 9 Drawing Sheets

U.S. PATENT DOCUMENTS

| | | |
|---|---|---|
| 6,584,567 B1 | 6/2003 | Bellwood et al. |
| 6,708,273 B1 * | 3/2004 | Ober et al. ............... 713/189 |
| 6,775,772 B1 | 8/2004 | Binding et al. |
| 6,789,147 B1 | 9/2004 | Kessler et al. |
| 6,795,930 B1 * | 9/2004 | Laurenti et al. ........... 713/324 |
| 6,983,366 B1 * | 1/2006 | Huynh et al. ............... 713/168 |
| 6,983,374 B2 * | 1/2006 | Hashimoto et al. ......... 713/194 |
| 7,103,759 B1 * | 9/2006 | Blixt ............................ 712/248 |
| 2001/0052070 A1 * | 12/2001 | Oishi et al. .................. 713/151 |
| 2002/0004904 A1 | 1/2002 | Blaker et al. |
| 2002/0146128 A1 | 10/2002 | Mauro et al. |
| 2005/0166038 A1 * | 7/2005 | Wang et al. ................ 712/226 |

OTHER PUBLICATIONS

Schneier, B., Applied Cryptography, Second Edition, published by John Wiley & Sons, Inc., Chapter 8 Key Management and Chapter 19 Public-Key Algorithms, 1996.

Yee, B., "Using Secure Coprocessors", School of Computer Science, Carnegie Mellon University, May 1994, (102 pages).

Data Sheet 6500 Public Key Processor, Hi/fn, Inc., 1997-2000, (45 pages).

Reference Hardware 6500 Public Key Processor, Hi/fn, Inc., 1997-1999, (9 pages).

6500 Data Windowing Examples Application Note, Hi/fn, Inc., 1997-1999, (9 pages).

European Search Report, Application No. EP 02 01 6423, filed Apr. 11, 2005, mailed Jun. 3, 2005, (3 pages).

"Intel Netstructure 7280 XML Director—User Guide", Chapters. 1 and 2, ftp://download.intel.com/support/netstructure/director/7280USR022201.pdf, retrieved May 4, 2005. Jan. 31, 2001, (28 pages) XP-002324084.

"ISD100-SSL, Secure Sockets Layer Offload Device—Installation and User's Guide" Pat. #050125, URL: http://www116.nortelnetworks.com/docs/bvdoc/alteon/isd_ssl/050125.C.pdf, retrieved Apr. 6, 2006, Alteon WebSystems, Sep. 1, 2000, pp. 1-59, XP-002323817.

European Search Report, Application. No. EP 02 01 6424, filed Apr. 8, 2005, mailed Jun. 3, 2005, (3 pages).

"How SSL Works" Online! Aug. 15, 2000 http://web.archive.org/web/20000815053048/http://developer.netscape.com/tech/security/ssl/howitworks.html retrieved Apr. 5, 2005, (4 pages) XP-002323818.

Dezso Sima, et al. "Advanced Computer Architectures" 1997, Addison-Wesley, Great Britain, Chapter 7.4 Shelving (pp. 209-216), XP-002323819.

* cited by examiner

DECOUPLED ARCHITECTURE FOR DATA CIPHERING OPERATIONS

CROSS REFERENCE TO RELATED APPLICATION

This application claims the benefit of U.S. provisional patent application No. 60/361,248, entitled "Decoupled Architecture for Data Ciphering Operations," filed Mar. 1, 2002 and provisional patent application No. 60/362,029, filed Mar. 6, 2002.

FIELD OF THE INVENTION

The invention relates to the field of computer processing. More specifically, the invention relates to a decoupled architecture for data ciphering operations.

BACKGROUND OF THE INVENTION

Communication networks and the number of users of such networks continue to increase. On-line sales involving both business-to-business and business to consumer over the Internet continues to proliferate. Additionally, the number of people that are telecommuting continues to grow. Both on-line sales and telecommuting are examples of usage of communication networks that typically involve private and sensitive data that needs to be protected during its transmission across the different communication networks.

Accordingly, security protocols, (e.g., Transport Layer Security (TLS), Secure Sockets Layer (SSL) 3.0, Internet Protocol Security (IPSec), etc.), have been developed to establish secure sessions between remote systems. These security protocols provide a method for remote systems to establish a secure session through message exchange and calculations, thereby allowing sensitive data being transmitted across the different communication networks to have a measure of security and/or untamperability.

Moreover, different operations related to encryption and decryption (such as Advanced Encryption Standard (AES), Data Encryption Standard (DES), RC4, hashing, etc.) have been developed to allow for these secure communications using such different security protocols. One current approach for the processing of these data encryption/decryption operations is to have a general-purpose processor execute software applications associated with the different data ciphering operations. While flexible enough to typically accommodate the different permutations of a given data ciphering operation, such an approach is typically slow in its execution of the operation. Further, this approach can include a very complex set of microinstructions associated with a given encryption/decryption operation. Accordingly, a large amount of memory is needed to store these microinstructions. In turn, the processor designed to process such instructions is typically very complex.

Another conventional approach for the processing of these data ciphering operations is to have a specific hardware state machine for each of the different data ciphering operations. While typically faster in execution in comparison to the software approach described above, such an approach lacks the flexibility to handle variations on the different data ciphering operations. One approach to this lack of flexibility could include having a different hardware state machine for the different variations of the different data ciphering operations. However, this approach can be prohibitively too expensive, complex and can require too large an area in terms of the size of the chip handling all of the different variations of the different ciphering operations.

SUMMARY OF THE INVENTION

A method, apparatus and system for a decoupled architecture for data ciphering operations are described. In one embodiment, an apparatus comprises a microcontroller unit to store instructions into an execution queue. The apparatus also comprises an execution queue unit to generate a widely decoded functional execution instruction based on at least one instruction stored in the execution queue. Additionally, the apparatus comprises a functional unit to execute the widely decoded functional execution instruction asynchronous to the generation of the widely decoded functional execution instruction.

BRIEF DESCRIPTION OF THE DRAWINGS

Embodiments of the invention may be best understood by referring to the following description and accompanying drawings that illustrate such embodiments. The numbering scheme for the Figures included herein are such that the leading number for a given element in a Figure is associated with the number of the Figure. For example, host execution unit 100 can be located in FIG. 1. However, element numbers are the same for those elements that are the same across different Figures.

In the drawings.

DETAILED DESCRIPTION

A method, apparatus and system for a decoupled architecture for data ciphering operations are described. In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Overview

Embodiments of the invention provide for a decoupled architecture such that the execution path for functional units is decoupled from the execution path of a separate processing/control unit that generates and queues the instructions that are to be executed by such functional units. Accordingly, the latter execution path is able to run ahead of the former execution path. Moreover, for a given data ciphering operation, embodiments of the invention execute portions of such operations via software execution, while executing other portions of such operations within hardware state machines.

Additionally, as will be described in more detail below, embodiments of the invention comprise a smaller and simpler set of microcode instructions used in the execution of data ciphering operations (in comparison to certain conventional approaches). Therefore, the processing unit to process such microcode instructions is simpler (in comparison to certain conventional approaches).

In one embodiment, a microcontroller unit executes a comparatively simple and limited set of instructions to generate large and more complex instructions that are subsequently stored in an execution queue and scheduled for execution in one of a number of functional units. In an embodiment, this execution by the microcontroller unit is asynchronous in comparison to the execution by the functional units, thereby allowing for a decoupled architecture between the generation of the large and more complex instructions and the execution of such instructions.

Therefore, as will be described in more detail below, the generation of the large and more complex instructions is programmable (controlled through the comparatively more simple and limited set of instructions). Further, embodiments of the invention allow for the processing of such large and more complex instructions without the penalty of storing such instructions.

Embodiments of the invention are described with reference to the generation and execution of a number of different security operations. However, embodiments of the invention are not so limited, as other types of operations can be incorporated into the decoupled architecture, described herein. For example, embodiments of the invention can generate and execute multimedia-based operations, various transmission protocol-based operations, etc.

Figure 1:
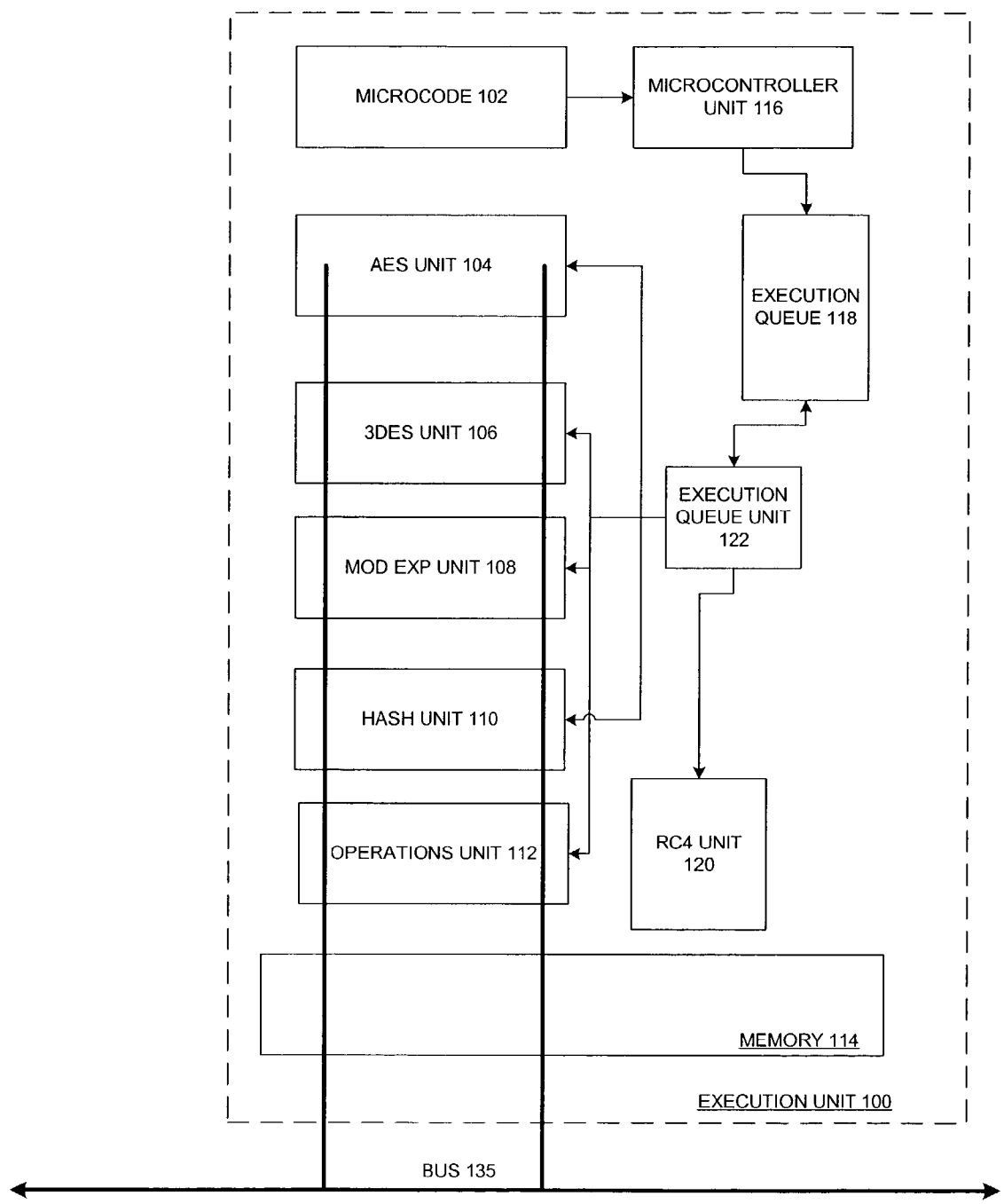
FIG. 1 is a block diagram illustrating a system for data encryption/decryption, according to one embodiment of the invention.
Figure 2:
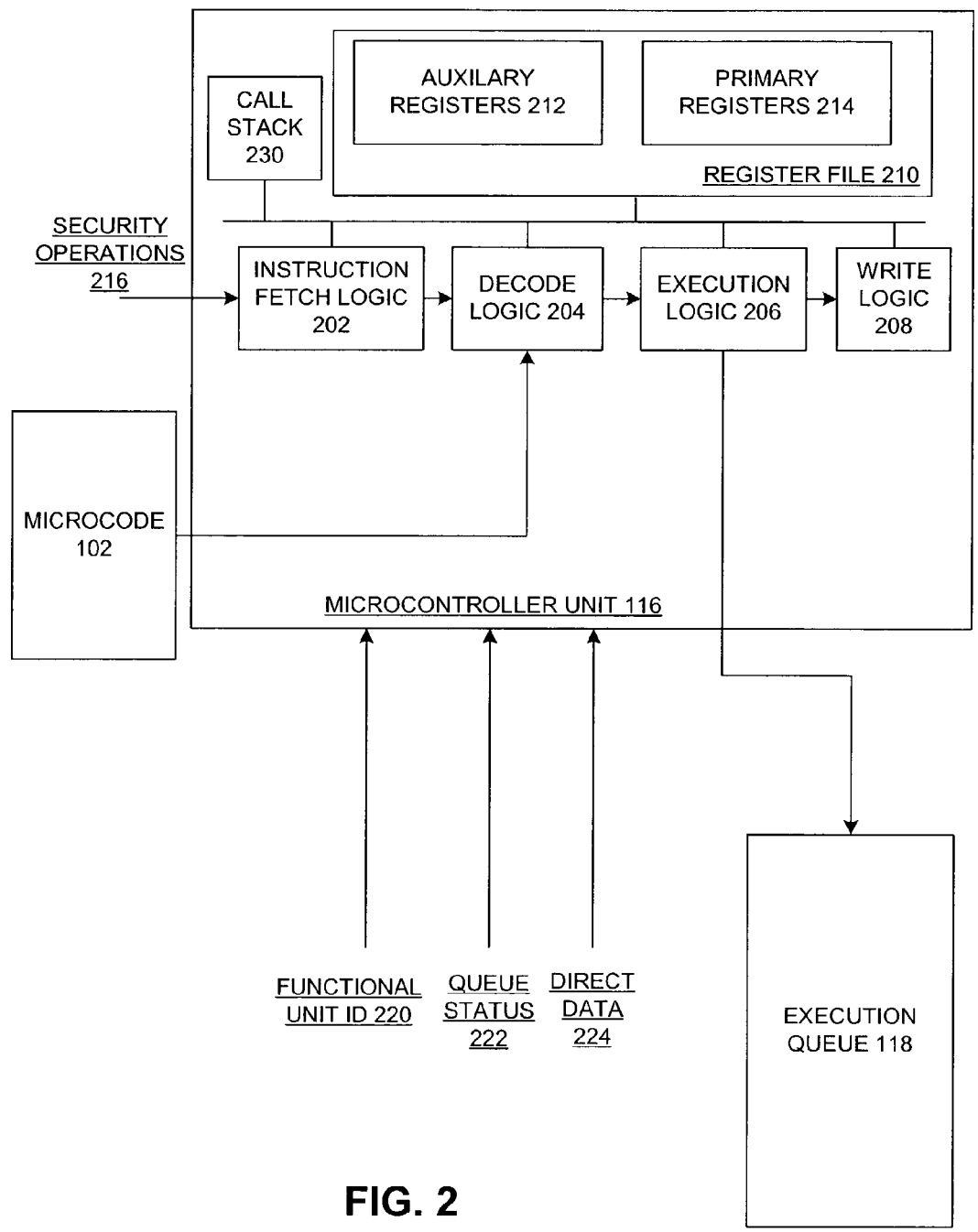
FIG. 2 is a more detailed block diagram of a microcontroller unit, according to one embodiment of the invention.
Figure 4:
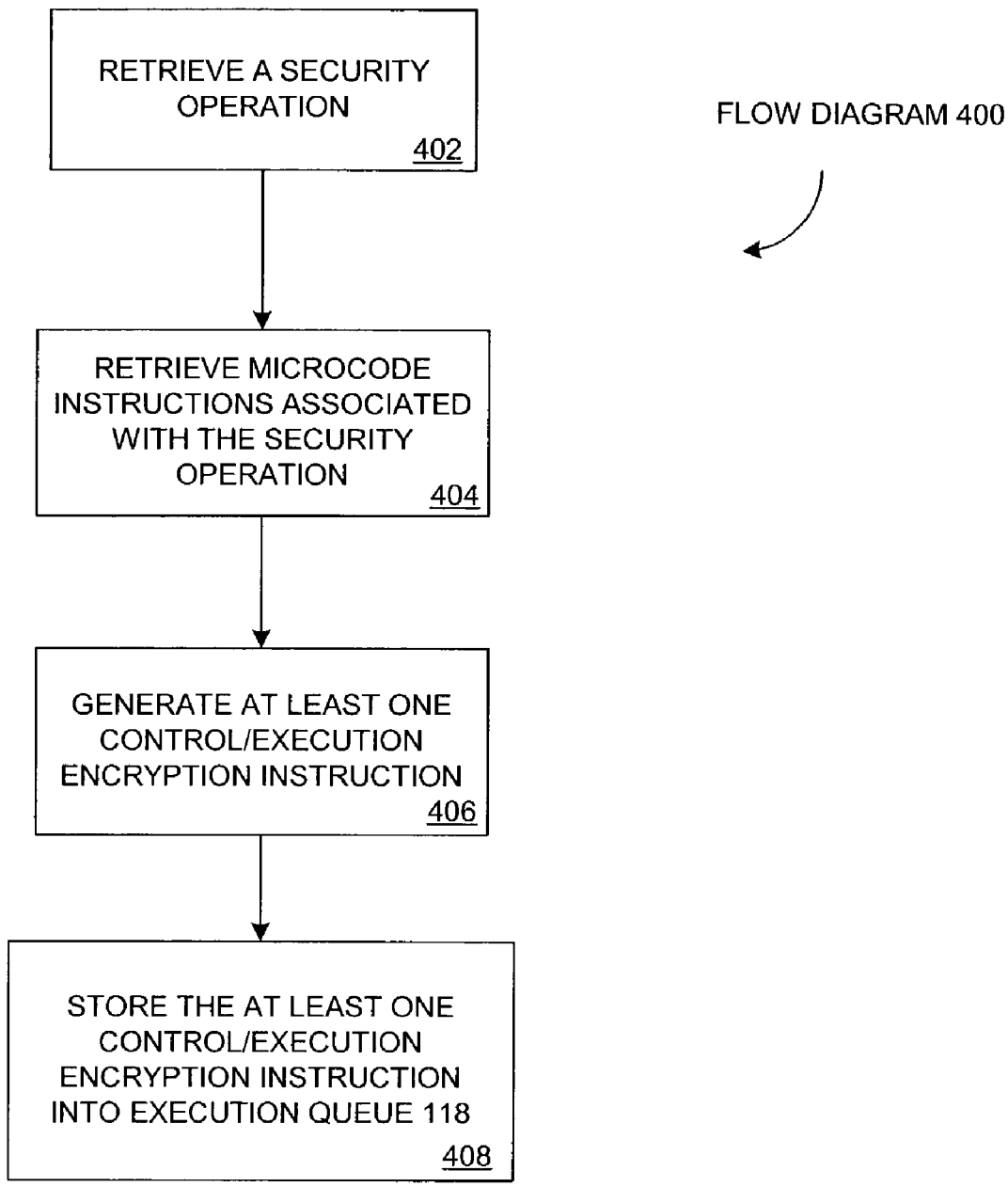
FIG. 4 is a flow diagram illustrating exemplary operations for the generation and storage of control/execution encryption instructions, according to one embodiment of the invention.
Figure 6:
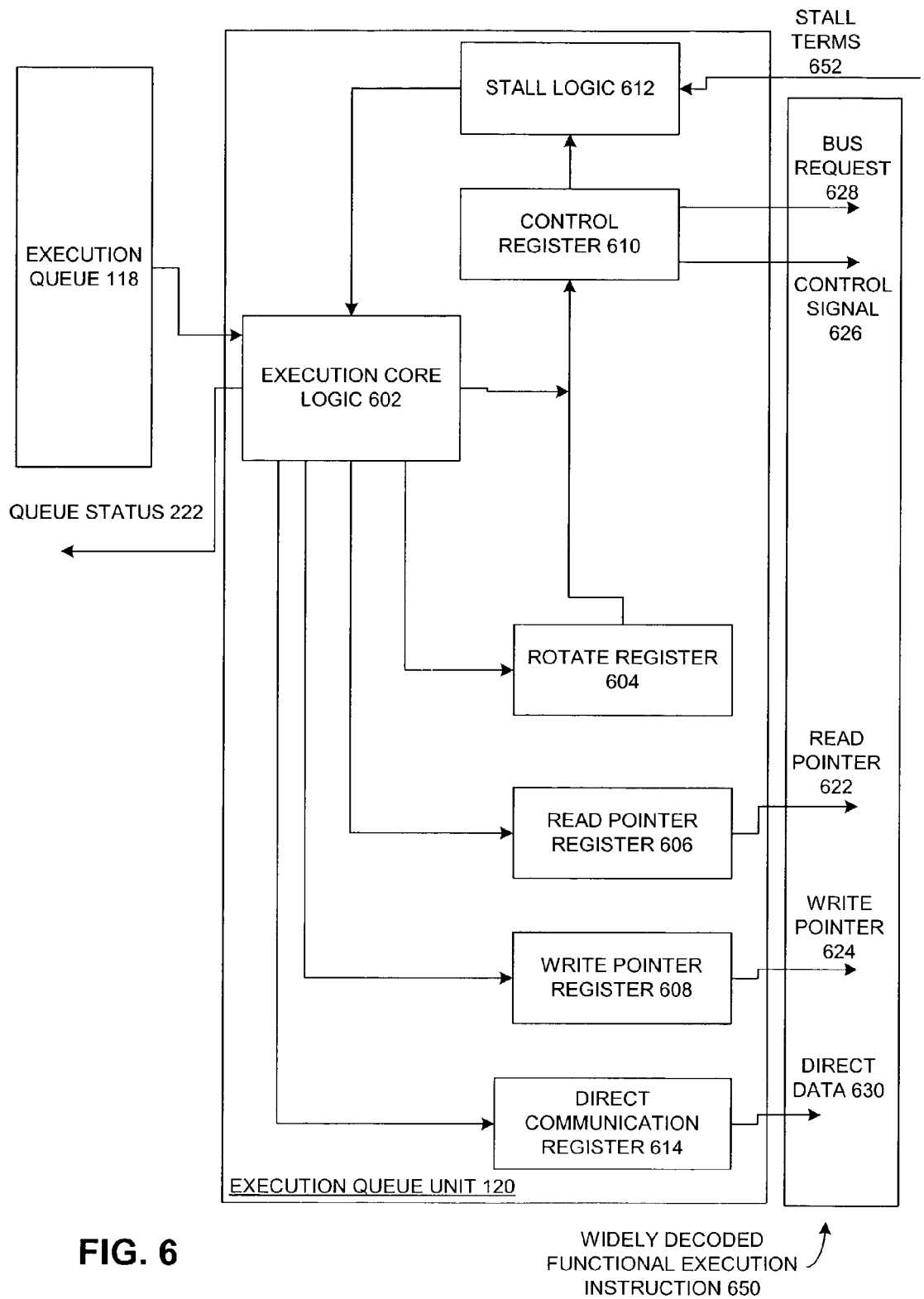
FIG. 6 is a more detailed block diagram of an execution queue unit, according to one embodiment of the invention.
Figure 7:
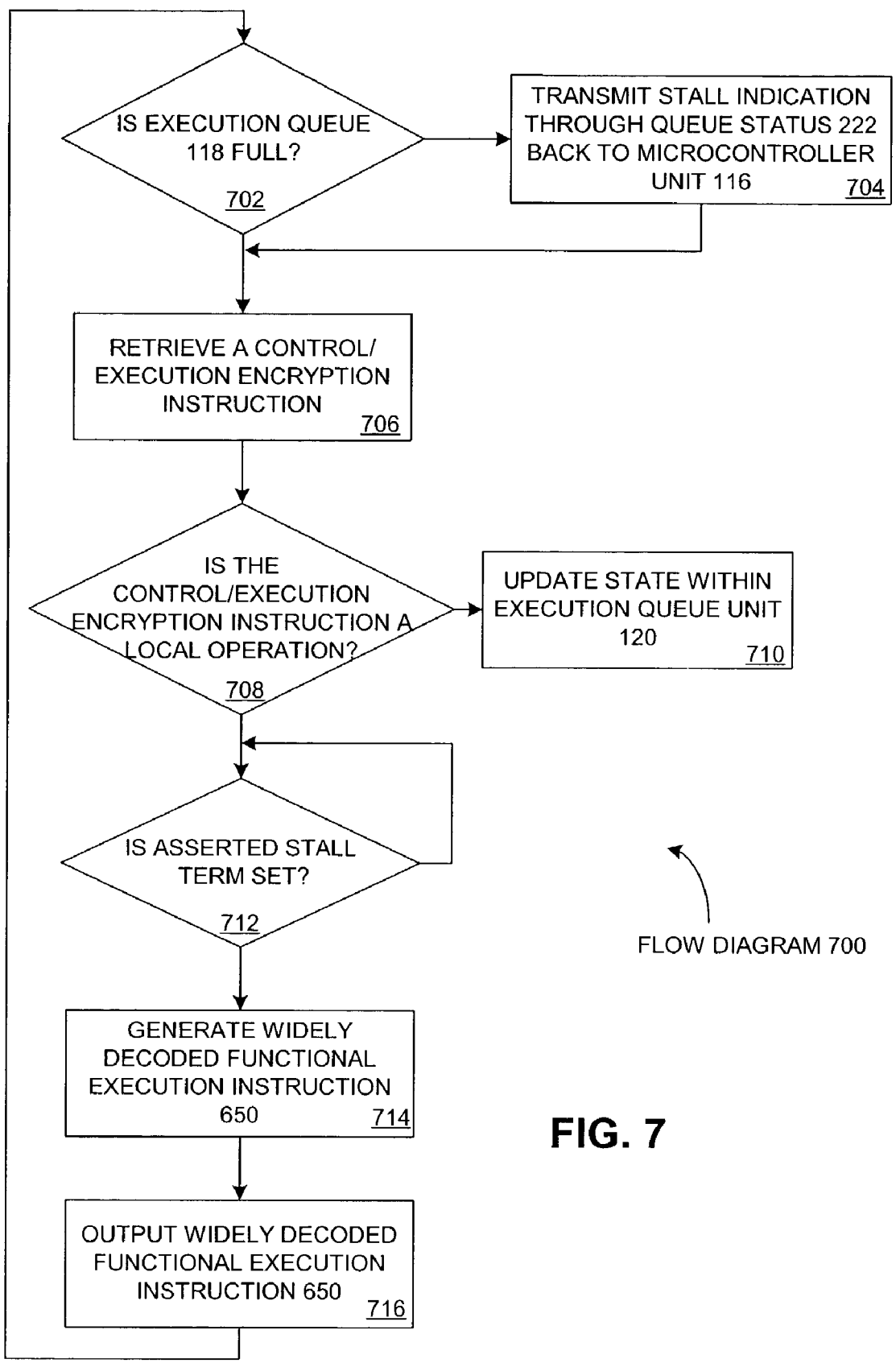
FIG. 7 is a flow diagram illustrating exemplary operations for the processing of control/execution encryption instructions, according to one embodiment of the invention.

FIGS. 1, 2 and 6 show block diagrams of exemplary systems for a decoupled architecture for data ciphering operations, in accordance with embodiments of the invention. FIGS. 4 and 7 show flow diagrams illustrating operations for a decoupled architecture for data ciphering operations, according to embodiments of the invention. The operations of the flow diagrams will be described with references to the exemplary systems shown in the block diagrams. However, it should be understood that the operations of the flow diagrams could be performed by embodiments of systems other than those discussed with reference to the block diagrams, and embodiments discussed with reference to the systems could perform operations different than those discussed with reference to the flow diagrams.

Execution Unit 100 Description

FIG. 1 is a block diagram illustrating a system for data encryption/decryption, according to one embodiment of the invention. In FIG. 1, execution unit 100 comprises microcode block 102, which is coupled to microcontroller unit 116. Although the size and number of microcode instructions stored in microcode 102 can vary, in an embodiment, there are 6144 microcode instructions within microcode 102, wherein such instructions are 16 bits in length.

The microcontroller unit 116 is coupled to execution queue 118. Execution queue 118 is coupled to execution queue unit 122. Execution queue unit 122 is coupled to a set of functional units. The functional units include Advanced Encryption Standard (AES) unit 104, Triple Data Encryption Standard (3DES) unit 106, modular exponentiation unit 108, hash unit 110, operations unit 112 and alleged RC4® (RC4) unit 120.

Alternative embodiments of the invention may include additional functional units or fewer functional units. Memory 114 is coupled to the functional units 104, 106, 108, 110 and 112 through bus 135. In one embodiment, bus 135 is also coupled to external memory and/or other execution units. For example, one such configuration is described in further detail in co-pending patent application, entitled "An Interface to a Security Co-Processor" Ser. No. 10/025,512 to Richard E. Kessler, David A. Carlson, Muhammad Raghib Hussain, Robert A. Sanzone and Khaja E. Ahmed, which is hereby incorporated by reference. Memory 114 can be any of a number or a combination of different types of memories (e.g., static random access memory (SRAM), dynamic random access memory (DRAM), etc.).

Microcontroller Unit 116 Description

FIG. 2 is a more detailed block diagram of a microcontroller unit, according to one embodiment of the invention. In particular, FIG. 2 illustrates an embodiment of microcontroller unit 116 that comprises instruction fetch logic 202, decode logic 204, execution logic 206, write logic 208, register file 210 and call stack 230. In an embodiment, register file 210 includes auxiliary registers 212 and primary registers 214.

Instruction fetch logic 202 is coupled to receive security operations 216. In an embodiment wherein execution unit 100 is part of a security coprocessor, security operations 216 are received from a memory of a host processor. In one embodiment of such a system is described in more detail below in conjunction with FIG. 9.

Figure 3:
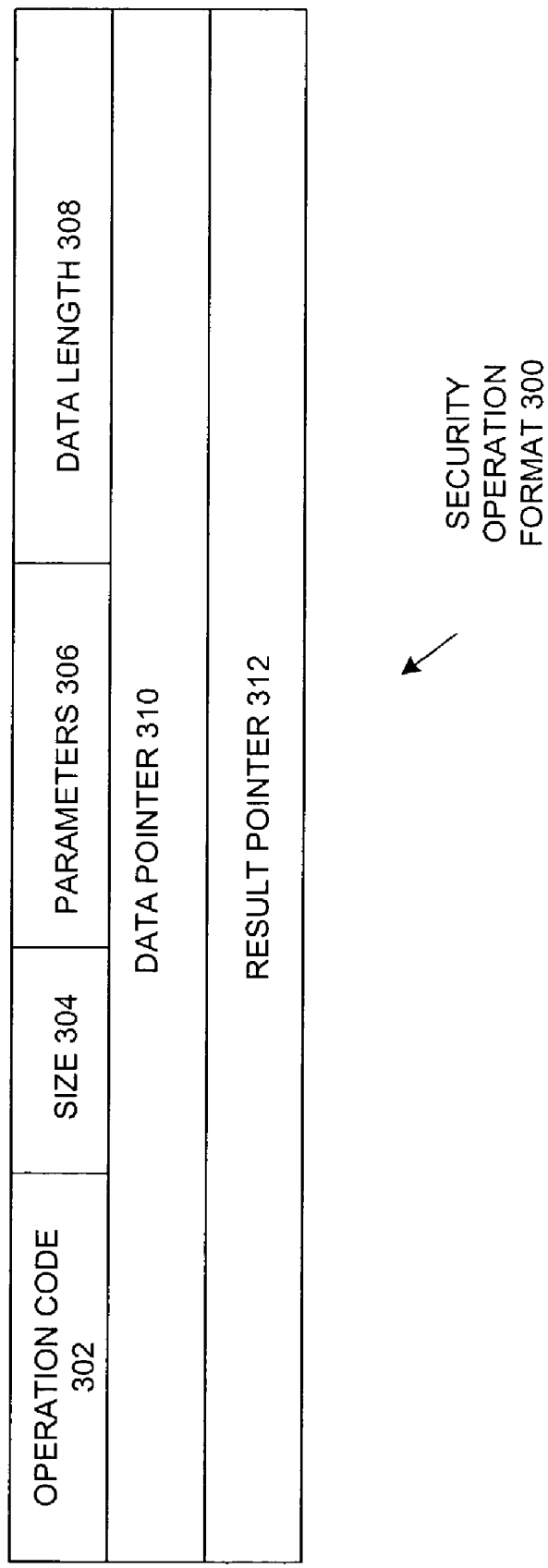
FIG. 3 illustrates an exemplary format for a security operation for processing by execution unit 100, according to one embodiment of the invention.

FIG. 3 illustrates an exemplary format for a security operation for processing by execution unit 100, according to one embodiment of the invention. In particular, FIG. 3 illustrates security operation format 300 that includes operation code 302, size 304, parameters 306, data length 308, data pointer 310 and result pointer 312. Operation code 302 includes the op-code to identify the different security operations to be performed by one of the functional units for hashing, modular exponentiation, etc. Size 304 can define sizes for different data related to the operation depending on the type of operation. For example, size 304 for a modular exponentiation operation could include the size of the modulus or for a hash operation could include the size of the data to be hashed.

Similar to size 304, parameters 306 can define different data related to the operation depending on the type of operation. For example, for the operation for the generation of keys for encryption/decryption, parameters 306 could define the length of the pre-master for the key. To further illustrate parameters 306, for the operation for the H-MAC operation, parameters 306 could define the length of the secret. In one embodiment, parameters 306 remain undefined for certain operations.

Data length 308 defines the length of the data structure that includes the relevant data for this security operation that is pointed to by data pointer 310 (within security operation format 300) and copied into memory 114 of execution unit 100.

This data structure pointed to by data pointer 310 can include different data depending on the type of security operation to be performed. In one embodiment, for given operations, this additional data structure is not needed, thereby making data pointer 310 unused. For example, for the operation to generate a random number, there is no input data. To help illustrate the type of data to be stored within such data structures, for a key generation operation, the data structure could include the client random number, the server random number, the label and the pre-master number.

Result pointer 312 defines the location within a memory that is externally coupled to execution unit 100 where the output results are stored. To help illustrate, assuming that execution unit 100 is within a coprocessor that is coupled to a host processor and a host memory, the memory wherein the output results are stored is the host memory.

Returning to FIG. 2, instruction fetch logic 202 is coupled to decode logic 204. Decode logic 204 is coupled to microcode 102. Decode logic 204 is also coupled to execution logic 206. Execution logic 206 is coupled to write logic 208. Execution logic 206 is also coupled to write logic 208 and execution queue 118.

Additionally, instruction fetch logic 202, decode logic 204, execution logic 206 and write logic 208 are coupled to call stack 230 and register file 210. As will be described in more detail below, execution logic 206 generates at least one control/execution encryption instruction based on the microcode for a given security operation 216. As will be described in more detail below, in an embodiment, the control/execution encryption instruction is a local operation, employed by execution queue unit 122 to update state (such as the value of a read pointer) therein. In one embodiment, the control/execution encryption instruction is a functional unit operation that is used to generate a widely decoded functional execution instruction.

As shown, the embodiment of microcontroller unit 116 illustrated in FIG. 2 comprises a four-stage pipeline that comprises (1) an instruction fetch, (2) a decode/register file read, (3) an execution and (4) a write. In one embodiment, execution logic 206 does not include a load operation. In an embodiment, execution logic 206 does not include a store operation. In one embodiment, external communications by microcontroller unit 116 are through execution queue 118, where communications are transmitted through execution queue 118 and through execution queue unit 118 to a bus coupled to execution unit 100 (which is described in more detail below). In an embodiment, microcontroller unit 116 provides for single-issue instructions with no bypass.

Microcontroller unit 116 is coupled to receive functional unit identification 220, queue status 222 and direct data 224. Direct data 224 is data being received directly back from one of the functional units (e.g., 3DES unit 106). In one embodiment, functional unit identification 220 indicates which one of the number of functional units are transmitting direct data 224 back to microcontroller unit 116.

Queue status 222 indicates if execution queue 118 is full or empty. In an embodiment, queue status 222 indicates how many entries are within execution queue 118. In one embodiment, the pipeline of microcontroller unit 116 is stalled upon receiving an indication (via queue status 222 shown in FIG. 6) from execution queue unit 120 that execution queue 118 is full. In an embodiment, the pipeline of microcontroller unit 116 conditionally stalls until execution queue 118 and the data pipeline for execution of a widely decoded functional execution instruction (illustrated in FIG. 8) is empty. In one such embodiment, this allows one of the functional units (e.g., 3DES unit 106) to transmit a value directly back to microcontroller unit 116 (i.e., direct data 224) (through direct communication register 614).

Generation/Storage of Control/Execution Encryption Instructions

FIG. 4 is a flow diagram illustrating exemplary operations for the generation and storage of control/execution encryption instructions, according to one embodiment of the invention. The operation of flow diagram 400 of FIG. 4 will be described with reference to the exemplary system of FIG. 2.

Figure 9:
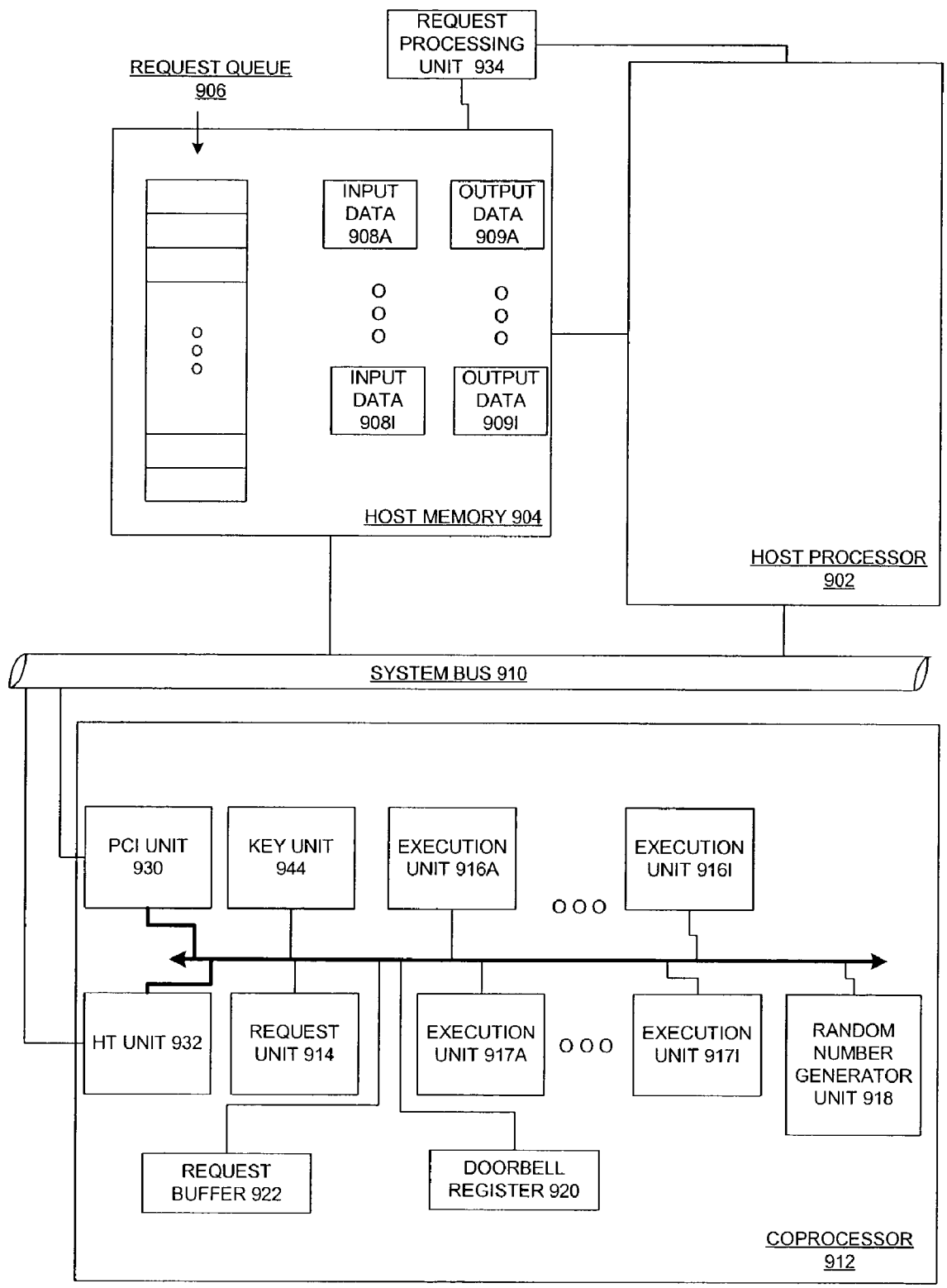
FIG. 9 is a block diagram illustrating a system for processing of security operations that includes a decoupled architecture for data ciphering operations, according to one embodiment of the invention.

As shown in block 402, a security operation is retrieved. With reference to the exemplary embodiment in FIG. 2, instruction fetch logic 202 retrieves the security operation. In an embodiment, instruction fetch logic 202 retrieves the security operation based on an instruction pointer (stored therein) and increments the instruction pointer for the retrieval of the subsequent security operation. In an embodiment, instruction fetch logic 202 retrieves the security operation from a memory externally coupled to execution unit 100 (not shown). With reference to FIG. 9 (which is described in more detail below), in one embodiment, instruction fetch logic 202 retrieves the security operation from request buffer 922 within coprocessor 912. Instruction fetch logic 202 forwards security operation 216 to decode logic 204.

In block 404, the microcode instructions and data associated with the security operation are retrieved. With reference to the exemplary embodiment in FIG. 2, decode logic 204 retrieves one or more microcode instructions associated with the security operation from microcode 102. Additionally, decode logic 204 retrieves the associated data from registers within register file 210. Decode logic 204 forwards the one or more microcode instructions and data to execution logic 206.

Figure 5:
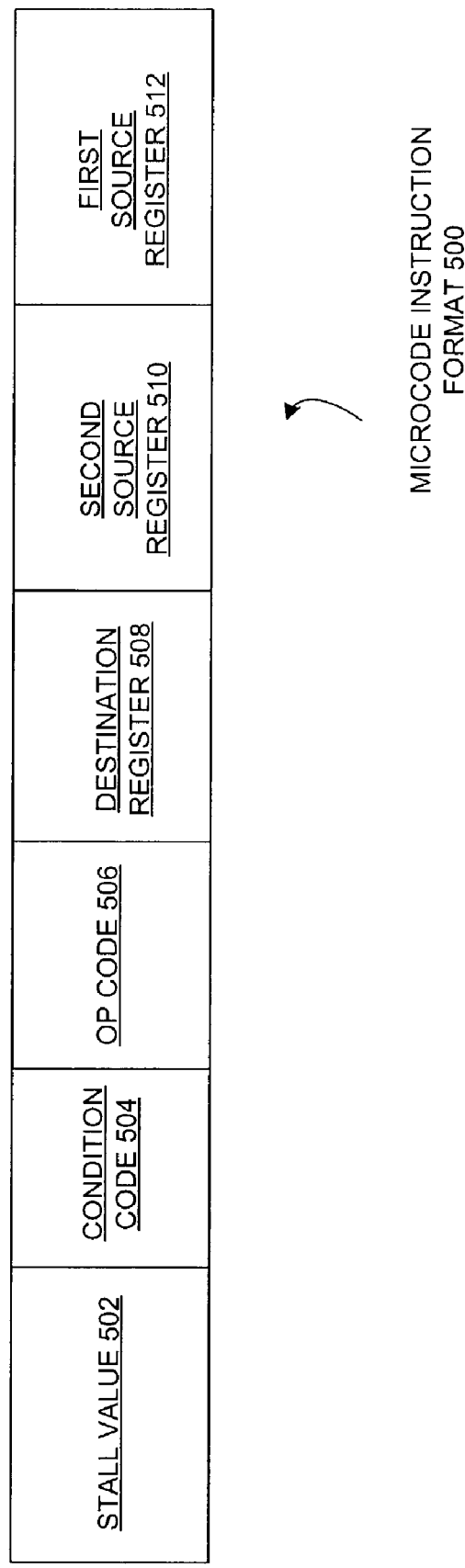
FIG. 5 illustrates an exemplary format for a microcode instruction for processing by microcontroller unit 116, according to one embodiment of the invention.

FIG. 5 illustrates an exemplary format for a microcode instruction for processing by microcontroller unit 116, according to one embodiment of the invention. In particular, FIG. 5 illustrates microcode instruction format 500 that includes stall value 502, condition code 504, op code 506, destination register 508, second source register 510 and first source register 512.

Stall value 502 includes a value that indicates whether microcontroller unit 116 should stall for a number of cycles prior to execution of this instruction. Accordingly, this stall allows a given microcode instruction to read the register results that were written in a prior microcode instruction. Condition code 504 includes a value that indicates whether this microcode instruction is to update the condition codes within microcontroller unit 116 based on the results of this instruction. In one embodiment, there are two condition code bits indicating (1) whether the result stored in the destination register is zero; and (2) whether the result was less than zero. In an embodiment, conditional branches branch based on these condition codes. Accordingly, a condition code update is available to a conditional branch instruction in the next cycle.

Op code 506 includes the op code to identify the operation to be performed, such as an add, shift, execute, etc. Destination register 508 includes the address of the register where the result of the microcode instruction is stored. Second source register 510 and first source register 512 include the addresses of the registers that include the values to be used for execution of the microcode instruction.

Returning to FIG. 4, in block 406, at least one control/execution encryption instruction is generated based on the one or more microcode instructions. With reference to the exemplary embodiment in FIG. 2, execution logic 206 generates the at least one control/execution encryption instruction based on the one or more microcode instructions and data. In one embodiment, a control/execution encryption instruction includes a "local" operation, which updates the state within execution queue unit 120 through modifications to different configuration registers therein. The local operation is described in more detail below. In an embodiment, a control/execution encryption instruction includes a functional unit operation. As will be described in more detail below, a functional unit operation causes execution queue unit 120 to generate a widely decoded functional execution instruction that is transmitted to appropriate units within the data pipeline (illustrated in FIG. 8).

In block 408, the at least one control/execution encryption instruction is stored into execution queue 118. With reference to the exemplary embodiment in FIG. 2, execution logic 206 stores the at least one control/execution encryption instruction into execution queue 118. Additionally, write logic 208 writes data back into register file 210.

For example, for a given 3DES security operation, data from memory 114 is retrieved, such that 3DES unit 106 is required to execute a given operation multiple times on such data. In particular, for a DES operation, for a given round that is executed multiple times, a core operation is performed on one of two parts of the data, such that the output of the core operation is XORed with the second part of the data, wherein the result of this XOR operation generates the two parts of data used in the next round of the DES operation.

Accordingly, a control/execution encryption instruction is generated to set the value of a read pointer to point to memory 114; a control/execution encryption instruction is generated to set the value of a write pointer to point to 3DES unit 106. Additionally, as will be described in more detail below, a control/execution encryption instruction is generated to set the value of a control register that will cause the operations by 3DES unit 106 to be repeated such that the XOR operation is executed after each round. As shown, in this example, a number of different control/execution encryption instructions are generated for a given security operation.

While embodiments of the invention are described such that a number of control/execution encryption instructions are generated and stored in an execution queue, in another embodiment, a number of the control/execution encryption instructions can be grouped together to have one control/execution instruction cause a number of the operations described above. For example, in one embodiment, one control/execution instruction sets the read pointer and the write pointer. In an alternative embodiment, all control/execution encryption instructions for a given security operation can be grouped into a single instruction that is to be stored into execution queue 118.

Execution Queue

FIG. 6 is a more detailed block diagram of an execution queue unit, according to one embodiment of the invention. As shown, execution queue unit 120 comprises execution core logic 602, stall logic 612, and a number of configuration registers (control register 610, rotate register 604, read pointer register 606, write pointer register 608 and direct communication register 614). Execution core logic 602 is coupled to receive control/execution encryption instructions from execution queue 118 (that were stored therein by microcontroller unit 116). Execution core logic 602 is coupled to transmit queue status 222 back to microcontroller unit 116 (not shown in FIG. 6).

Execution core logic 602 is coupled to rotate register 604, read pointer register 606, write pointer register 608 and direct communication register 614. Rotate register 604 is coupled to control register 610. Control register 610 is coupled to stall logic 612. Execution core logic 602 is coupled to receive data from stall logic 612. Additionally, stall logic 612 is coupled to receive stall terms 652 from the different functional units. In an embodiment, stall terms 652 comprise a signal from each of the different functional units. In one embodiment, stall logic 612 is a multiplexer whose selection of output is controlled by control register 610. Accordingly, a given stall term from a particular functional unit is transmitted to execution core logic 602.

Widely decoded functional execution instruction 650, which comprises bus request 628, control signal 626, read pointer 622, write pointer 624 and direct data 630, is transmitted out from execution queue unit 120 based on the control/execution encryption instruction received. As will be described in more detail below, bus request 628, control signal 626, read pointer 622, write pointer 624 and direct data 630 are transmitted to other units internal and/or external to execution unit 100 and are thus employed in the execution of widely decoded functional execution instruction 650.

Bus request 628 and control signal 626 are outputted from control register 610. Read pointer 622 is outputted from read pointer register 606. Write pointer 624 is outputted from write pointer register 608. Direct data 630 is outputted from direct communication register 614.

Processing of Control/Execution Encryption Instructions

FIG. 7 is a flow diagram illustrating exemplary operations for the processing of control/execution encryption instructions, according to one embodiment of the invention. The operation of flow diagram 700 of FIG. 7 will be described with reference to the exemplary system of FIG. 6.

As shown in block 702, a determination is made of whether execution queue 118 is full. With reference to the exemplary embodiment in FIG. 6, execution core logic 602 makes the determination of whether execution queue is full. For example, in an embodiment, execution core logic 602 compares the current read pointer for execution queue 118 that indicates the current level of entries therein with the maximum size for execution queue 118 in making this determination.

In block 704, upon determining that execution queue 118 is full, a stall indication is transmitted through queue status 222 back to microcontroller unit 116. With reference to the exemplary embodiment in FIG. 6, execution core logic 602 transmits this stall indication back to microcontroller unit 116. Accordingly, in an embodiment, microcontroller unit 116 stalls the generation and storage of control/execution encryption instructions into execution queue 118.

In block 706, whether or not execution queue 118 is full, a control/execution encryption instruction is retrieved. With reference to the exemplary embodiment in FIG. 6, execution core logic 602 retrieves the control/execution encryption instruction from execution queue 118.

In block 708, the decision is made whether the control/execution encryption instruction is a local operation. With reference to the exemplary embodiment in FIG. 6, execution core logic 602 determines whether the control/execution encryption instruction is a local operation. In an embodiment, a local operation can include one to a number of entries in execution queue 118. For example, a local operation associated with a repeat operation comprises three entries. The first entry is the operational code for a repeat operation; the second entry is the length of the repeat operation; and the third entry is the functional unit operation to be repeated. To further illustrate, a local operation to perform a rotate includes two entries in execution queue 118. The first entry is the operational code for a rotate operation, and the second entry is the rotate value to load.

In block 710, upon determining that the control/execution encryption instruction is a local operation, the state within execution queue unit 120 is updated. With reference to the exemplary embodiment in FIG. 6, execution core logic 602 updates the state within execution queue unit 120. For example, different registers, such as write pointer register 608, are updated. In an embodiment, a local operation comprises an operation to load a value into read pointer register 606. In one embodiment, a local operation comprises an operation to load a value into write pointer register 608. In one embodiment, a local operation comprises an operation to load a value into control register 610. In an embodiment, a local operation comprises an operation to load a value into rotate register 604. In one embodiment, a local operation comprises an operation to load a value into direct communication register 614.

In block 712, upon determining that the control/execution encryption instruction is not a local operation (but rather a functional operation), the decision is made whether the asserted stall term is set. With reference to the exemplary embodiment in FIG. 6, execution core logic 602 determines whether the asserted stall term that is received from stall logic 612 is set. In one embodiment, control register 610 controls which of the stall terms are asserted and thus transmitted to execution core logic 602. In particular, in an embodiment, each functional unit could transmit a stall term to stall logic 612 (which, in an embodiment, is a multiplexer), wherein control register 610 controls which term is asserted and transmitted to execution core logic 602. Therefore, if the asserted stall term is set, execution core logic 602 does not execute the current control/execution encryption instruction and continues to checking when this stall term is not set.

The use of stall terms 652 are used in conjunction with functional operations that are dependent on each other. For example, the output of one functional operation can be used as input for a subsequent functional operation. Accordingly, execution core logic 602 waits for the former functional operation to complete prior to issuing the subsequent functional operation. In one embodiment, if the functional operations are not dependent on each other, execution core logic 602 can issue the associated widely decoded functional execution instruction for a latter functional operation prior to completion of a former functional operation. Accordingly, in one embodiment, execution queue unit 120 provides for in-order issuance of the functional operations with possible out-of-order completion.

In block 714, upon determining that the asserted stall term is not set, a widely decoded functional execution instruction 650 is generated. With reference to the exemplary embodiment in FIG. 6, execution core logic 602 generates the widely decoded functional execution instruction 650. In an embodiment, widely decoded functional execution instruction 650 comprises bus request 628, control signal 626, read pointer 622, write pointer 624 and direct data 630. In one embodiment, widely decoded functional execution instruction 650 can include a lesser number of values. For example, if there are no bus transactions associated with this instruction, bus request 628 is not included within such an instruction. In one embodiment, widely decoded functional execution instruction 650 comprises portions of data from read pointer register 606, portions of data from write pointer register 608, and portions of data from control register 610. In one embodiment, the values within widely decoded functional execution instruction 650 determine the execution of the functional operation while traversing the datapath pipeline (which is described below in conjunction with FIG. 8).

In block 716, the widely decoded functional execution instruction 650 is outputted. With reference to the exemplary embodiment in FIG. 6, execution core logic 602 outputs the widely decoded functional execution instruction 650 to the appropriate units within the datapath pipeline (as described below). The processing shown in flow diagram 700 continues in block 702, wherein the determination is made of whether execution queue 118 is full. As described, the determining of whether execution queue 118 is full is made in conjunction with the other operation of flow diagram 700. However, embodiments of the invention are not so limited. For example, in another embodiment, this determination and generation of a stall indication can be executed as a separate process within execution core logic 602.

Datapath Pipeline Description

Figure 8:
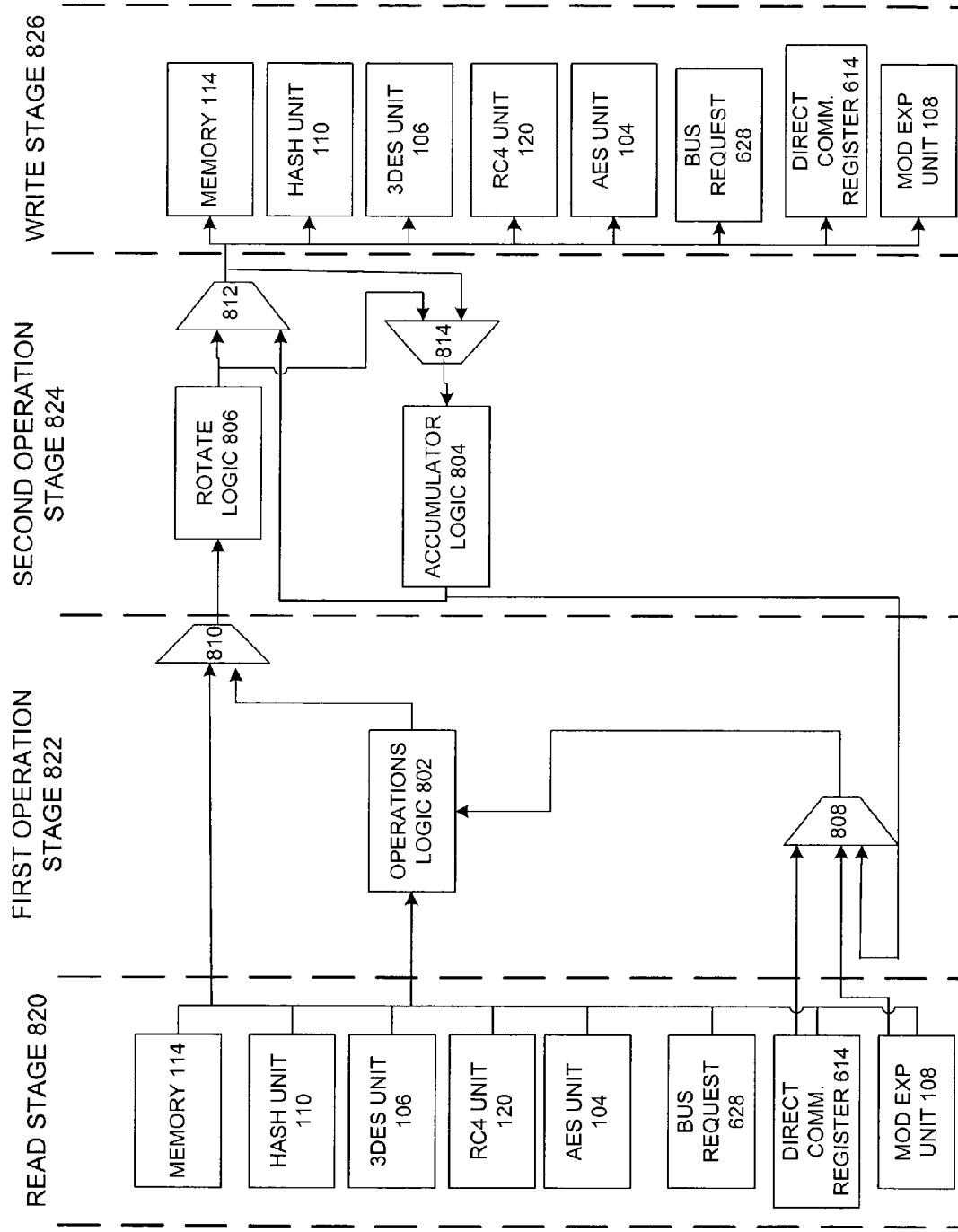
FIG. 8 is a data pipeline for execution of a widely decoded functional execution instruction, according to one embodiment of the invention.

FIG. 8 is a data pipeline for execution of a widely decoded functional execution instruction, according to one embodiment of the invention. As shown, the data pipeline of FIG. 8 comprises read stage 820, first operation stage 822, second operation stage 824 and write stage 826. First operation stage 822 and second operation stage 824 include a number of units within operations unit 112. In particular, operations unit 112 comprises operations logic 802, multiplexer 808, multiplexer 810, rotate logic 806, accumulator logic 804, multiplexer 812 and multiplexer 814.

With regard to read stage 820, memory 114, hash unit 110, 3DES unit 106, RC4 unit 120, AES unit 104, bus request 628, direct communication register 614 and modular exponentiation unit 108 are coupled to an input of operations logic 802 and an input of multiplexer 810 in first operation stage 822. Additionally, direct communication register 614 and modular exponentiation unit 108 is coupled to an input of multiplexer 808.

With regard to first operation stage 822, the input of operations logic 802 is coupled to memory 114, hash unit 110, 3DES unit 106, AES unit 104, bus request 628, direct communication register 614 and modular exponentiation unit 108. Additionally, an input of multiplexer 810 is coupled to receive data from memory 114, hash unit 110, 3DES unit 106, AES unit 104, bus request 628, direct communication register 614 and modular exponentiation unit 108. An input of multiplexer 808 is also coupled to an output of accumulator logic 804 (from the second operation stage 824). The output from multiplexer 808 is coupled as an input to operations logic 802. The output from operations logic 802 is coupled to an input of multiplexer 810. The output of multiplexer 810 is coupled to an input of rotate logic 806 (in second operation stage 824).

With regard to second operation stage 824, an input of rotate logic 806 is coupled to receive the output of multiplexer 810. The output of rotate logic 806 is coupled to an input of multiplexer 812 and an input of multiplexer 814. The output of accumulator logic 804 is coupled to an input of multiplexer 812. The output of multiplexer 812 is coupled to an input of multiplexer 814. With regard to write stage 826, the output of multiplexer 812 is also coupled to write data to memory 114, hash unit 110, 3DES unit 106, RC4 unit 120, AES unit 104, bus request 628, direct communication register 614 and modular exponentiation unit 108.

In operation, the components illustrated in the datapath pipeline of FIG. 8 receive different portions of widely decoded functional execution instruction 650, thereby controlling the pipeline operations. In one embodiment, execution core logic 602 transmits read pointer 622 to memory 114, hash unit 110, 3DES unit 106, RC4 unit 120, AES unit 104, bus request 628, direct communication register 614 and modular exponentiation unit 108. In an embodiment, the value of read pointer 622 indicates which of the units in read stage 820 (memory unit 114, hash unit 110, 3DES unit 106, RC4 unit 120, AES unit 104, bus request 628, direct communication register 614 and modular exponentiation unit 108) data is read from. Additionally, in an embodiment, the value of read pointer 622 indicates where within the designated unit (e.g., memory unit 114) the data is to be read from.

Accordingly, data from the given unit(s) (shown in read stage 820) is outputted to one or more of the units shown in first operation stage 822. Additionally, control signal 626 is outputted to one or more units shown in first operation stage 822. In one embodiment, control signal 626 controls which of the inputs from direct communication register 614, modular exponentiation unit 108 and accumulator logic 804 is outputted to an input of multiplexer 808.

In one embodiment, data within the designated unit (from read stage 820) is outputted to an input of operations logic 802. Control signal 626 controls the operation of operations logic 802. In one embodiment, operations logic 802 performs an add operation of the two inputs received (i.e., the input from the output of multiplexer 808 and the input form one of the designated units). In an embodiment, operations logic 802 performs an XOR operation of the two inputs received. In one embodiment, operations logic 802 performs a compare operation of the two inputs received. In other embodiments, operations logic 802 can include other operations, including, but not limited to, an OR operation, a subtract operation, an AND operation, etc.

The output operation for operations logic 802 is outputted to an input of multiplexer 810. In one embodiment, data within the designated unit (from read stage 820) is outputted to an input of multiplexer 810. In an embodiment, control signal 626 controls the selection of the inputs to be outputted from multiplexer 810. Therefore, as described in one embodiment, data is transferred from one of the units (shown in read stage 822) to the second operations stage 824 without operations, such as an add operation, within first operation stage 822. In another embodiment, an operation, such as an XOR operation, is performed within first operation stage 822 on the data read from one of the units (shown in read stage 822) prior to transmitting the data to second operation stage 824.

The output from multiplexer 810 is inputted into rotate logic 806. Control signal 626 controls the operations of rotate logic 806. In one embodiment, no rotation is performed within rotate logic 806, as the data is passed through to the output. In an embodiment, rotate logic 806 rotates the data received one to a number of times. The output of rotate logic 806 is transmitted to the inputs of multiplexer 812 and multiplexer 814. Additionally, the output of accumulator logic 804 is transmitted to multiplexer 812 and multiplexer 808. Control signal 626 controls the selection of the inputs to be outputted from multiplexer 812. Accordingly, the output from rotate logic 806 or the output from accumulator logic 804 is outputted from multiplexer 812. The output from multiplexer 812 can be written to the input of multiplexer 814 and/or one of the units shown in write stage 826 (as will be described below).

Control signal 626 controls the selection of the inputs to be outputted from multiplexer 814. Accordingly, the output from rotate logic 806 or the output from multiplexer 812 can be inputted into accumulator logic 804. In one embodiment, control signal 626 transmits a signal wherein data is not inputted into accumulator logic 804 for a given widely decoded functional execution instruction 650.

In an embodiment, accumulator logic 804 has a current value that is added to the value received. This added value replaces the current value and is outputted from accumulator logic 804. Accordingly, in one embodiment, this accumulated value can be selected by multiplexer 812, such that the accumulated value is stored in one of the units shown in write stage 826. In an embodiment, this accumulated value is selected as an input into operations logic 802 (by multiplexer 808). For example, this accumulated value could be XORed with the current value received from hash unit 110.

Accordingly, with regard to second operation stage 824, in one embodiment, data can be passed through this stage without operations thereon (through rotate logic 806 and multiplexer 812). In an embodiment, one to a number of rotations of the data can be performed and passed on to write stage 826. In an embodiment, an accumulation can be performed in conjunction with the data and passed on to write stage 826. In one embodiment, one to a number of rotations can be performed in conjunction with an accumulation.

In one embodiment, execution core logic 602 transmits write pointer 624 to memory 114, hash unit 110, 3DES unit 106, RC4 unit 120, AES unit 104, bus request 628, direct communication register 614 and modular exponentiation unit 108. In an embodiment, the value of write pointer 624 indicates which of memory unit 114, hash unit 110, 3DES unit 106, RC4 unit 120, AES unit 104, bus request 628, direct communication register 614 and modular exponentiation unit 108 data is written into from second operation stage 824. Additionally, in an embodiment, the value of write pointer 624 indicates where within the designated unit (e.g., memory unit 114) the data is to be written.

Therefore, as described, based on a widely decoded functional execution instruction, data is passed from one unit to another unit without operations within first operation stage 822 and second operation stage 824. In one embodiment, based on a widely decoded functional execution instruction, data is received from a unit, wherein one of a number of different operations, such as an XOR operation, is performed on the data (within first operation stage 822) and passed to another unit. In an embodiment, based on a widely decoded functional execution instruction, data is received from a unit, wherein a rotation and/or an accumulation is performed on the data and passed to another unit. In one embodiment, data is received from a unit, wherein an operation within first operation stage 822 and a rotation and/or an accumulation of the data is performed and passed to another unit.

System Description

FIG. 9 is a block diagram illustrating a system for processing of security operations that includes a decoupled architecture for data ciphering operations, according to one embodiment of the invention. FIG. 9 includes host processor 902, host memory 904, coprocessor 912 and request processing unit 934. Host processor 902, host memory 904 and coprocessor 912 are coupled to system bus 910. Additionally, host processor 902, host memory 904 and request processing unit 934 are coupled together. In an embodiment, request processing unit 934 can be a process or task that can reside within host memory 904 and/or host processor 902 and can be executed within host processor 902. For example, request processing unit 934 may be a driver for the coprocessor executed by the host processor, wherein the driver interfaces with Open SSL. However, embodiments of the invention are not so limited, as request processing unit 934 can be different types of hardware (such as digital logic) executing the processing described therein.

Host memory 904 stores request queue 906, input data 908A-908I and output data 909A-909I. Request queue 906 is illustrated and described in terms of a queue. However, embodiments of the invention are not so limited, as request queue 906 can be any other type of data structure for storage of requests to be transmitted to coprocessor 912, which is described in more detail below. In one embodiment, request queue 906 is a circular queue (ring buffer). In an embodiment, the write pointer for request queue 906 is maintained by request processing unit 934 and the read pointer for request queue 906 is maintained by request unit 914 of coprocessor 912. Accordingly, request processing unit 934 increments its write pointer when storing requests into request queue 906, while request unit 914 decrements its read pointer when extracting or retrieving requests from request queue 906.

Additionally, although input data 908A-908I and output data 909A-909I are data structures that are described as tables, such data can be stored in other types of data structures, such as data objects in an object-oriented environment. In one embodiment, input data 908A-908I are contiguously stored in host memory 904. Accordingly, request unit 914 within coprocessor 912 can extract the input data across multiple requests using one direct memory access (DMA) read operation.

Requests inserted into request queue 906 by request processing unit 934 can include instructions, such as an operation code, the data to be operated on as well as a pointer to other locations in host memory 904 storing data (which is related to the request) that could not be placed into the request inside request queue 906, due to restraints on the size of the requests. In particular, requests within request queue 906 can point to one of input data 908A-908I. In one embodiment, these requests are 32 bytes in size. The types of requests can comprise different security operations including, but not limited to, a request to (1) generate a random number, (2) generate a prime number, (3) perform modular exponentiation, (4) perform a hash operation, (5) generate keys for encryption/decryption, (6) perform a hash-message authentication code (H-MAC) operation, (7) perform a handshake hash operation and (8) perform a finish/verify operation.

Coprocessor 912 includes Peripheral Component Interconnect (PCI) unit 930, lightening data transport (LDT) unit 932, key unit 944, request unit 914, doorbell register 920, execution units 916A-916I, execution units 917A-917I, random number generator unit 918 and request buffer 922, which are coupled together. Additionally, PCI unit 930 and LDT unit 932 are coupled to system bus 910. PCI unit 930 and LDT unit 932 provide communication between the different components in coprocessor 912 and host memory 904, host processor 902 and request processing unit 934. While one embodiment is described in which PCI and LDT units are used to connect to a system bus, alternative embodiments could use different buses.

The number of execution units 916 and 917 and the number of random number generator units 918 are by way of example and not by way of limitation, as a lesser or greater number of such units can be included within coprocessor 912. In one embodiment, execution units 916-917 execute the data ciphering operations described above. For example, in an embodiment, execution unit 300 (illustrated in FIG. 3) is one of execution units 916-917. Random number generator unit 918 generates random numbers for the generation of keys. Key unit 944 can store keys locally within coprocessor 912 for execution units 917A-917I that can be subsequently used for processing of different security operations without requiring the retrieval of such keys from memory that is external to coprocessor 912. Request unit 914 extracts requests within request queue 906 based on values inserted into doorbell register 920 and distributes such requests to execution units 916-917 for processing, which is described in more detail below. Request buffer 922 can store the requests extracted by request unit 914 for processing by execution units 916-917. Further operations of the system illustrated in FIG. 9 are described in further detail in co-pending patent application, entitled "An Interface to a Security Co-Processor" Ser. No. 10/025,512 to Richard E. Kessler, David A. Carlson, Muhammad Raghib Hussain, Robert A. Sanzone and Khaja E. Ahmed.

While one embodiment is described in which each execution unit has its own microcode block, alternative embodiments have one or more execution units share a single microcode block. Yet other embodiments have a central microcode block (e.g., in SRAM) whose contents are loaded upon power-up into local microcode blocks in each of the execution units. Regardless of the arrangement of the microcode block(s), in certain embodiments the microcode blocks are reprogrammable to allow for flexibility in the selection of the security operations (be they macro and/or primitive security operations) to be performed.

Memory described herein includes a machine-readable medium on which is stored a set of instructions (i.e., software) embodying any one, or all, of the methodologies described herein. Software can reside, completely or at least partially, within this memory and/or within processors described herein. For the purposes of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media; optical storage media, flash memory devices, electrical, optical, acoustical, or other form of propagated signals (e.g., carrier waves, infrared signals, digital signals, etc.), etc.

Thus, a method, apparatus and system for a decoupled architecture for data ciphering operations have been described. Although the invention has been described with reference to specific exemplary embodiments, it will be evident that various modifications and changes may be made to these embodiments without departing from the broader spirit and scope of the invention. However, embodiments of the invention are not so limited, as smaller and/or lesser portions of the plaintext can be used to generate the ciphertext. Accordingly, the specification and drawings are to be regarded in an illustrative rather than a restrictive sense.

What is claimed is:

1. An apparatus comprising:

a microcontroller unit to store an instruction into an execution queue;

an execution queue unit to generate a widely decoded functional execution instruction to control a datapath pipeline by execution of the instruction stored in the execution queue; and a plurality of functional units, each of the plurality of functional units coupled with the datapath pipeline, each of the plurality of functional units having a different function and each of the functional units to execute the widely decoded functional execution instruction asynchronous to generation of the widely decoded functional execution instruction by the execution queue unit, wherein one of the plurality of the functional units is to execute a data ciphering operation based on the execution of the widely decoded functional execution instruction, wherein the plurality of functional units include an advanced encryption standard unit, a data encryption standard unit and a hash unit, and wherein the datapath includes a first stage with the plurality of functional units and a second stage with operational logic to process the output of the first stage.

2. The apparatus of claim 1, wherein the microcontroller unit is to generate and store the instructions into the execution queue based on a security operation.

3. The apparatus of claim 1, wherein one of the plurality of functional units is to execute the widely decoded functional execution instruction based on data generated from a different functional unit from the plurality of functional units.

4. The apparatus of claim 3, wherein the execution queue unit is to stall the retrieval of the instruction from the execution queue upon receiving a stall term from one of the plurality of functional units.

5. The apparatus of claim 4, wherein one of the plurality of functional units is to transmit the stall term to the execution queue unit when execution of the widely decoded functional execution instruction is dependent on another widely decoded functional execution instruction.

6. The apparatus of claim 1, wherein the execution queue unit is to update a state of the execution queue unit based on the instruction.

7. The apparatus of claim 6, wherein the state comprises a number of configuration registers.

8. The apparatus of claim 7, wherein the execution queue unit is to generate the widely decoded functional execution instruction based on the state of the number of configuration registers.

9. An apparatus comprising:

a microcontroller unit coupled to receive a number of security operations, the microcontroller unit to generate a number of encryption instructions, using a number of microcode instructions, based on the number of security operations, wherein the microcontroller unit is to store the number of encryption instructions into an execution queue;

an execution queue unit coupled to the execution queue, the execution queue unit to retrieve the number of the encryption instructions from the execution queue, wherein the execution queue unit is to generate widely decoded functional execution instructions to control a datapath pipeline by execution of the encryption instructions; and a number of functional units coupled to the execution queue unit and the datapath pipeline, each of the functional units having a different function, the execution queue unit to output the widely decoded functional execution instructions to the number of functional units in an order that the associated execution instructions are stored in the execution queue, wherein the number of functional units are to execute the widely decoded functional execution instructions asynchronous to generation of the widely decoded functional execution wherein the number of functional units are to complete execution of at least one of the widely decoded functional execution instructions in an order that is different from the order that the associated encryption instructions are stored in the execution queue.

10. The apparatus of claim 9, wherein the microcontroller unit is to store the number of encryption instructions into the execution queue at a rate that is faster than a rate that the execution queue unit is to output the decoded functional execution instructions to the number of functional units during at least a portion of the time when the apparatus is executing.

11. The apparatus of claim 9, wherein the number of functional units are to execute data ciphering operations based on the widely decoded functional execution instructions.

12. The apparatus of claim 9, wherein the execution queue unit is to update a state of the execution queue unit based on at least one of the encryption instructions.

13. The apparatus of claim 12, wherein the state comprises a number of configuration registers.

14. The apparatus of claim 13, wherein the execution queue unit is to generate the widely decoded functional execution instruction based on the state of the number of configuration registers.

15. The apparatus of claim 9, wherein at least one of the number of functional units is to execute the widely decoded functional execution instruction based on data generated from a different functional unit.

16. The apparatus of claim 9, wherein the execution queue unit is to stall the retrieval of the number of the encryption instructions from the execution queue upon receiving a stall term from one of the number of functional units.

17. The apparatus of claim 16, wherein the one of the number of functional units is to transmit a stall term to the execution queue unit when execution of one widely decoded functional execution instruction is dependent on another widely decoded functional execution instruction.

18. A coprocessor coupled to a host processor and a host memory, the coprocessor comprising:

an interface unit to retrieve an operation from the host memory based on an instruction from the host processor; and an execution unit coupled to the interface unit, the execution unit comprising:

an execution queue;

a microcontroller unit to generate a number of instructions based on the operation, wherein the microcontroller unit is to store the number of instructions into the execution queue; and an execution queue unit to retrieve the number of instructions from the execution queue, wherein the execution queue unit is to generate widely decoded functional execution instructions to control a datapath pipeline by execution of the number of instructions; and a number of functional units coupled with a datapath pipeline to execute the widely decoded functional execution instructions, wherein the execution of the widely decoded functional execution instructions is asynchronous to the generation and storage of the number of instructions into the execution queue, each of the number of functional units having a different wherein the number of functional units are to execute a data ciphering operation based on the execution of the widely decoded functional execution instructions, wherein the number of functional units include an advanced encryption standard unit, a data encryption standard unit and a hash unit, and wherein the datapath includes a first stage with the number of functional units and a second stage with operational logic to process the output of the first stage.

19. The coprocessor of claim 18, wherein the execution queue unit to output the widely decoded functional execution instructions to the number of functional units in an order that the associated execution instructions are stored in the execution queue.

20. The coprocessor of claim 19, wherein the microcontroller unit is to store the number of instructions into the execution queue at a rate that is faster than a rate that the execution queue unit is to output the decoded functional execution instructions to the number of functional units during at least a portion of the time when the coprocessor is executing.

21. The coprocessor of claim 18, wherein at least one of the number of functional units is to execute the widely decoded functional execution instruction based on data generated from a different functional unit.

22. The coprocessor of claim 18, wherein the execution queue unit is to stall the retrieval of the number of the instructions from the execution queue upon receiving a stall term from one of the number of functional units.

23. The coprocessor of claim 22, wherein the one of the number of functional units is to transmit a stall term to the execution queue unit when execution of one widely decoded functional execution instruction is dependent on another widely decoded functional execution instruction.

24. The coprocessor of claim 19, wherein the number of functional units are to complete execution of at least one of the widely decoded functional execution instructions in an order that is different from the order that the associated execution instructions are stored in the execution queue.

25. The coprocessor of claim 18, wherein the execution queue unit is to update a state of the execution queue unit based on at least one of the instructions.

26. The coprocessor of claim 25, wherein the state comprises a number of configuration registers.

27. The coprocessor of claim 26, wherein the execution queue unit is to generate the widely decoded functional execution instruction based on the state of the number of configuration registers.

28. A computer-implemented method comprising:

generating an instruction based on an operation;

storing the instruction into an execution queue;

retrieving the instruction from the execution queue;

generating a widely decoded functional execution instruction to control a datapath pipeline by executing the instruction from the execution queue, the widely decoded functional execution instruction including a first portion to be processed by a first functional unit and a second portion to be processed by a second functional unit, the first functional unit and the second functional unit having different functions;

wherein the first functional unit and the second functional unit are executing a data ciphering operation based on the execution of the widely decoded functional execution instructions, wherein the first functional unit and the second functional units include an advanced encryption standard unit, a data encryption standard unit and a hash unit, wherein the datapath includes a first stage with the number of functional units and a second stage with operational logic to process the output of the first stage; and executing the widely decoded functional execution instructions, wherein the execution of the widely decoded functional execution instructions is asynchronous to the generation of the widely decoded functional execution instructions.

29. The computer-implemented method of claim 28, wherein at least one of the widely decoded functional execution instructions is dependent on an output of a different widely decoded functional execution instruction.

30. The computer-implemented method of claim 28, comprising stalling the retrieval of the number of instructions from the execution queue upon receiving a stall term from one of a number of functional units executing the widely decoded functional execution instructions.

* * * * *

UNITED STATES PATENT AND TRADEMARK OFFICE
CERTIFICATE OF CORRECTION

| | | |
|---|---|---|
| PATENT NO. | : 7,305,567 B1 | Page 1 of 1 |
| APPLICATION NO. | : 10/234895 | |
| DATED | : December 4, 2007 | |
| INVENTOR(S) | : Muhammad Raghib Hussain et al. | |

It is certified that error appears in the above-identified patent and that said Letters Patent is hereby corrected as shown below:

In the claims

Claim 9, column 16, line 6, after "execution", insert -- instructions, -- and

Claim 18, column 17, line 2, after "different", insert -- function, --.

Signed and Sealed this
Seventeenth Day of November, 2015

Michelle K. Lee
*Director of the United States Patent and Trademark Office*